Dec. 23, 1958   R. M. HEINTZ   2,866,111
INDUCTOR ALTERNATOR
Filed April 23, 1956

INVENTOR
R. M. HEINTZ
BY
ATTORNEY

United States Patent Office 2,866,111
Patented Dec. 23, 1958

2,866,111

INDUCTOR ALTERNATOR

Ralph M. Heintz, Los Gatos, Calif., assignor to International Telephone and Telegraph Corporation, New York, N. Y., a corporation of Maryland Application April 23, 1956, Serial No. 579,887

1 Claim. (Cl. 310—168)

This invention relates to inductor alternators and has for its object to provide an improved construction suitable for small machines and which results in high efficiency when the machine is run at high speeds.

Further objects of the invention are to reduce eddy current losses in the rotor and to dispense with revolving windings, commutators, slip rings or brushes.

According to a principal feature of my invention the armature and field windings are located in slots in the stator, and a toothed outer rotor, which carries no windings, is mounted to rotate about the stator.

Further objects and features of my invention will be seen from the following detailed description in conjunction with the accompanying drawing which shows by way of example one embodiment of the invention and in which.

Figure 1:
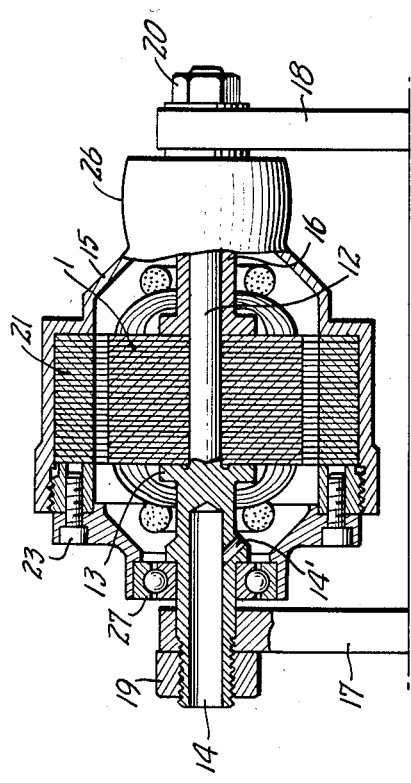
Fig. 1 is a side view of the machine partly in section.

Referring to the drawing, the core of the stator 1 is preferably made, as is customary, of laminated magnetic material and is provided with four equally-spaced slots 2, 3, 4 and 5 (Fig. 2) in its outer periphery between which are formed four pole faces 6, 7, 8 and 9. The armature or output coils 10 are located in a diametrically opposite pair of slots such as 2 and 4, and the field or exciting coils 11 are located, in a plane at right-angles to the plane of armature coils 10, in the other diametrically opposite pair of slots 3 and 4.

The stator core is threaded over a shaft 12 (Fig. 1) having at one end an enlarged diameter forming a collar 13 against which the stator core abuts. One end of the shaft 12 is drilled axially with an opening 14 which communicates via a channel way 14' with the interior of a rotatable housing 15 thus providing a path for the leads from the armature and field coils 10, 11. A sleeve 16 which is threaded over the other end of the shaft 12 secures the stator core in position when the shaft 12 is clamped between mounting columns 17, 18 by tightening nuts 19, 20.

The rotor 21 is also preferably made from laminated stampings. An end cap 22 is adapted to be screwed into the housing 15 and locked by a screw 23.

The rotor 21 is clamped between peripheral surfaces of the housing 15 and end cap 22, and is shaped to provide a pair of internally-projecting diagonally-opposite teeth 24, 25, the width of which corresponds to the width of the pole faces 6 to 9 of the stator core. The housing 15 is formed at its end with a pulley surface 26 to accommodate a driving belt and the housing end cap and rotor assembly is journalled on a pair of ball races such as 27, mounted respectively on the two ends of the shaft 12.

Figure 2:
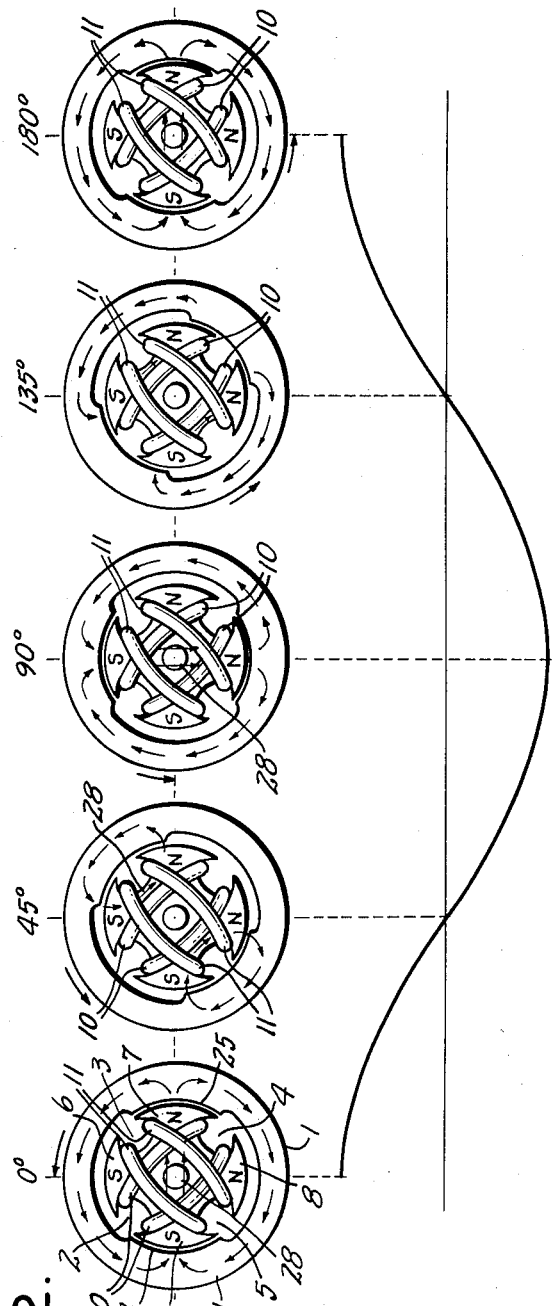
Fig. 2 is a schematic representation of the magnetic flux changes which occur as the rotor of the machine turns through 180°, and beneath is shown a wave form diagram of the output.

Referring now particularly to Fig. 2, if the revolution of the rotor 21 is followed from left to right, it will be noted that the flux path changes in the rotor and the induced lines of force reverse through the armature coils 10 but do not reverse in the field coils 11. Commencing at zero degrees and rotating the rotor 45° counter-clockwise, the flux passes through the field coils 11 as indicated by the arrows 28 and divides on each side of the armature coils 10. At this stage in the cycle no voltage is induced in the armature coils. In the condition at 90° the flux lines still thread the field coils 11 but now also thread the armature coils 10 which produces a negative voltage, as indicated in the diagram. It will be noted that the flux still threads the field coils 11 in the same direction as in the 45° position. At 135° the flux again still threads the field coils in the same direction but goes around the armature coils 10 and thus induces no voltage. At 180° which corresponds to the zero position in the diagram, the flux still threads the field coils 11 in the same direction, but also threads the armature coils 10, but now in the opposite direction to that at the 90° position thereby producing a positive voltage as indicated in the diagram. It will thus be seen that a complete electrical cycle takes place in one-half of a revolution of the rotor 21 and, therefore, the frequency of the current generated is twice as great as that of a conventional salient pole machine of the two pole kind. It will also be noted that the flux does not reverse in the back area of the rotor, but only in the pole shoes. This has the effect of reducing eddy current losses in the rotor and it will be seen also that the eddy current frequency in the rotor is half that in the armature core which also reduces the eddy current losses in the rotor to less than half of the losses in conventional inductor machines.

The principal advantages of the construction according to the invention are reduction in cost and ability to operate at high temperatures and high speeds since the only moving part of the machine is the inductor rotor which comprises a simple stack of laminations which carries no windings and can be revolved at very high speeds without danger of damage. The construction also lends itself to combination with a turbo-alternator as a unitary structure.

While I have described above the principles of my invention in connection with specific apparatus, it is to be clearly understood that this description is made only by way of example and not as a limitation to the scope of my invention.

What is claimed is:

An inductor alternator comprising an inner stator having four equally spaced slots forming therebetween four equal-width pole faces, a field winding located in a diametrically opposite pair of said slots, an output winding located in the other diametrically opposite pair of slots and a rotor surrounding said stator and having a pair of internally projecting diametrically opposite teeth the width of said teeth being the same as that of said pole faces.

References Cited in the file of this patent

UNITED STATES PATENTS

| 529,145 | Thury | Nov. 13, 1894 |
| 1,304,229 | Wiard | May 20, 1919 |

FOREIGN PATENTS

| 286,792 | Italy | June 22, 1931 |
| 350,959 | France | Apr. 22, 1905 |
| 488,957 | Germany | Jan. 10, 1930 |
| 512,158 | France | Oct. 7, 1920 |
| 836,680 | France | Oct. 17, 1938 |